(12) United States Patent   (10) Patent No.:   US 9,210,210 B2
Lee   (45) Date of Patent:   Dec. 8, 2015

(54) PERMISSION-BASED SNAPSHOTS FOR DOCUMENTS SHARED ON A SOCIAL MEDIA SERVICE

(71) Applicant: Google Inc., Mountain View, CA (US)

(72) Inventor: Li-Wei Lee, New York, NY (US)

(73) Assignee: Google Inc., Mountain View, CA (US)

( * ) Notice: Subject to any disclaimer, the term of this patent is extended or adjusted under 35 U.S.C. 154(b) by 198 days.

(21) Appl. No.: 13/865,310

(22) Filed: Apr. 18, 2013

(65) Prior Publication Data

US 2015/0195330 A1   Jul. 9, 2015

(51) Int. Cl.
*H04L 29/08* (2006.01)

(52) U.S. Cl.
CPC ..................................... *H04L 67/02* (2013.01)

(58) Field of Classification Search
CPC ....... G06Q 10/10; G06Q 50/01; G06Q 30/02; G06Q 30/06; G06Q 30/0201; G06Q 30/0601; G06Q 40/02; G06Q 10/00; G06Q 10/02; G06Q 10/06; G06Q 10/063; H04N 1/00132; H04N 21/4223; H04N 1/00137; H04N 1/00145; H04N 1/00151; H04N 1/00172; H04N 1/00196; H04L 65/403; H04L 2463/101; H04L 67/02; G06F 17/211; G06F 17/3089; G06F 17/30011; G06F 17/30893

USPC ......... 709/204, 224, 205–207, 217–219, 225; 707/648, 752
See application file for complete search history.

(56) References Cited

U.S. PATENT DOCUMENTS

| 8,868,506 | B1* | 10/2014 | Bhargava et al. ............. 707/648 |
| 2007/0005595 | A1* | 1/2007 | Gafter ............................... 707/6 |
| 2009/0037523 | A1* | 2/2009 | Kolke et al. .................... 709/203 |
| 2011/0277039 | A1* | 11/2011 | Harris et al. ..................... 726/28 |
| 2012/0096151 | A1* | 4/2012 | Chernaik et al. ............. 709/224 |
| 2013/0268829 | A1* | 10/2013 | Lansford et al. .............. 715/205 |
| 2014/0244749 | A1* | 8/2014 | Martin et al. .................. 709/204 |
| 2014/0280605 | A1* | 9/2014 | Zhang ............................ 709/205 |
| 2014/0289263 | A1* | 9/2014 | Otala ............................. 707/752 |

* cited by examiner

*Primary Examiner* — Ruolei Zong
(74) *Attorney, Agent, or Firm* — Ropes & Gray LLP

(57) ABSTRACT

A method of storing a preview image of a document shared over a social media service includes receiving at a server a first notification that a document stored on the server is being shared on a post by a first user on the social media service, where the first notification includes information identifying the first user. The method further includes generating a thumbnail image from the document, where the thumbnail image is stored in the document metadata and is a representative image of a first version of the document at the time the user shares the document, associating the thumbnail image with a URL, where the URL has an access control list that includes the first user, and sending the URL from the server to the social media service.

35 Claims, 9 Drawing Sheets

PERMISSION-BASED SNAPSHOTS FOR DOCUMENTS SHARED ON A SOCIAL MEDIA SERVICE

BACKGROUND

Social media services are web-based services that allow users to connect with each other and to share thoughts, photographs, videos, links, and other content with each other. For example, a user creates a viewable profile containing information related to the user. The user can upload a photograph and allow people connected with the user to view and comment upon the photograph. A user may also share a uniform resource locator (URL) link, which links to a news story or other web content that the user wishes to share with his or her contacts. The URL may link to a document stored online. For example, cloud storage services are web-based services that allow users to store word processing documents, spreadsheets, presentations, photographs, videos, and other files remotely. Users can access their files in the cloud storage service from any device that may connect to the cloud storage service. The cloud storage service may provide a URL for each file that a user stores in the cloud, and a user can share this URL with other people on a social media service.

When a URL is shared on a social media service, a thumbnail or snapshot of the URL target may also be posted along with the URL. This thumbnail gives other users a preview image of the content of the URL target. For example, a shared URL linking to a web page may include a thumbnail of a picture that is stored on the web page. If a web page is a news story, the picture may be a photograph associated with the news story. When a user shares a URL of a document stored on a cloud storage service, a thumbnail image of the document may also be posted. This thumbnail shows a preview of the document, for example the first slide of a presentation document. The cloud storage service may provide the social media service with a URL linking to the thumbnail so that it may be posted on the social media service. However, some cloud storage services may cache and update document thumbnails so that the most recent version of the document is always shown in the thumbnail. Thus if a user shared a document on a social media service and subsequently updated the document, the thumbnail of the document on the social media service is also updated to reflect the changes. This may cause problems if the user does not want others to see changes made to the document. In addition, if the document is deleted by the user, the social media service may still display a thumbnail of the document, thus allowing others to continue to view a preview of a document that has been deleted.

SUMMARY

The systems and methods described herein provide a way for a user to share a document stored on a cloud storage service with a social media service, where the preview thumbnail of the document is static and does not change when the document is edited. Thus the thumbnail reflects the state of the document at the time the user shares the document. In addition, the thumbnail is deleted when the document is deleted. A document stored on the cloud storage service is associated with a URL. When a user shares the URL of the document on a social media service, the social media service sends a notification or request to the cloud storage service that the user is attempting to share the document. The notification includes information identifying the user sharing the document. The cloud storage service generates a thumbnail preview of the document at the time the user shares the document, and stores it in the metadata of the document on the cloud storage service. The thumbnail is associated with a URL that has an access control list (ACL). The user is added to the ACL and the URL is sent to the social media service. The social media service uses the URL to present the thumbnail to any person that views the preview of the document. The thumbnail is not updated when the user edits the document, so the same thumbnail is displayed on the social media service regardless of future changes to the document. When the user deletes the document, the document metadata, including the thumbnail, is also deleted. The social media service no longer displays any thumbnail because the URL associated with the thumbnail becomes nonfunctional.

One aspect described herein discloses a method for storing a preview image of a document shared over a social media service. The method includes receiving at a server a first notification that a document stored on the server is being shared on a post by a first user on the social media service, where the first notification includes information identifying the first user. The method further includes generating a thumbnail image from the document, where the thumbnail image is stored in the document metadata and is a representative image of a first version of the document at the time the user shares the document. The method further includes associating the thumbnail image with a URL, where the URL has an access control list that includes the first user, and sending the URL from the server to the social media service.

Another aspect described herein discloses a system for storing a preview image of a document shared over a social media service, where the system includes a server. The server is configured to communicate with a plurality of client computers and a social media service using a communication connection, and receive a first notification that a document stored on the server is being shared on a post by a first user on the social media service, where the first notification includes information identifying the first user. The server is further configured to generate a thumbnail image from the document, where the thumbnail image is stored in the document metadata and is a representative image of a first version of the document at the time the user shares the document. The server is further configured to associate the thumbnail image with a URL, where the URL has an access control list that includes the first user, and send the URL from the server to the social media service.

Another aspect described herein discloses a method for showing a preview image for a document stored on a cloud storage service, where the method includes receiving, at a server hosting a social media service, a request from a first user to share a post of a document stored on the cloud storage system with a plurality of contacts, and sending a first notification to the cloud storage service that the first user is sharing the document, where the first notification includes information identifying the first user. The method further includes receiving a URL from the cloud storage system, where the URL links to a thumbnail image representative of a first version of the document at the time the first user shares the document, and displaying the thumbnail image to a first contact in the plurality of contacts when the first contact requests the thumbnail image.

Another aspect described herein discloses a system for showing a preview image for a document stored on a cloud storage service, where the system includes a server. The server is configured to communicate with a plurality of client computers and the cloud storage service using a communication connection, and receive a request from a first user to share a post of a document stored on the cloud storage system with a plurality of contacts. The server is further configured to send a first notification to the cloud storage service that the first user is sharing the document, where the first notification includes information identifying the first user, receive a URL from the cloud storage system, where the URL links to a thumbnail image representative of a first version of the document at the time the first user shares the document, and display the thumbnail image to a first contact in the plurality of contacts when the first contact requests the thumbnail image.

BRIEF DESCRIPTION OF THE DRAWINGS

The methods and systems may be better understood from the following illustrative description with reference to the following drawings in which.

DETAILED DESCRIPTION

To provide an overall understanding of the systems and methods described herein, certain illustrative embodiments will now be described, including systems and methods for displaying a preview thumbnail of a document stored on a cloud storage service and shared on a social media service. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out amongst the various computing devices.

Aspects of the systems and methods described herein relate to a way to provide static preview thumbnails for a document stored on a cloud storage service and shared on a social media service. Both the cloud storage service and social media service may be provided using one or more servers connected to a network such as the Internet. A user on a client computer connects to the social media service. A document stored on the cloud storage service is associated with a URL. When the user shares the URL of the document on the social media service, the social media service sends a notification, or request, to the cloud storage service that the user is attempting to share the document. The notification includes information identifying the user sharing the document. The cloud storage service generates a thumbnail preview of the document at the time the user shares the document, and stores it in the metadata of the document on the cloud storage service. The thumbnail is associated with a URL that has an ACL. The user is added to the ACL and the URL is sent to the social media service. The social media service uses the URL to present the thumbnail to any person that views the preview of the document. The thumbnail is not updated when the user edits the document, so the same thumbnail is displayed on the social media service regardless of future edits to the document. When the user deletes the document, the document metadata, including the thumbnail, is also deleted. The social media service no longer displays any thumbnail because the URL associated with the thumbnail becomes nonfunctional.

Figure 1:
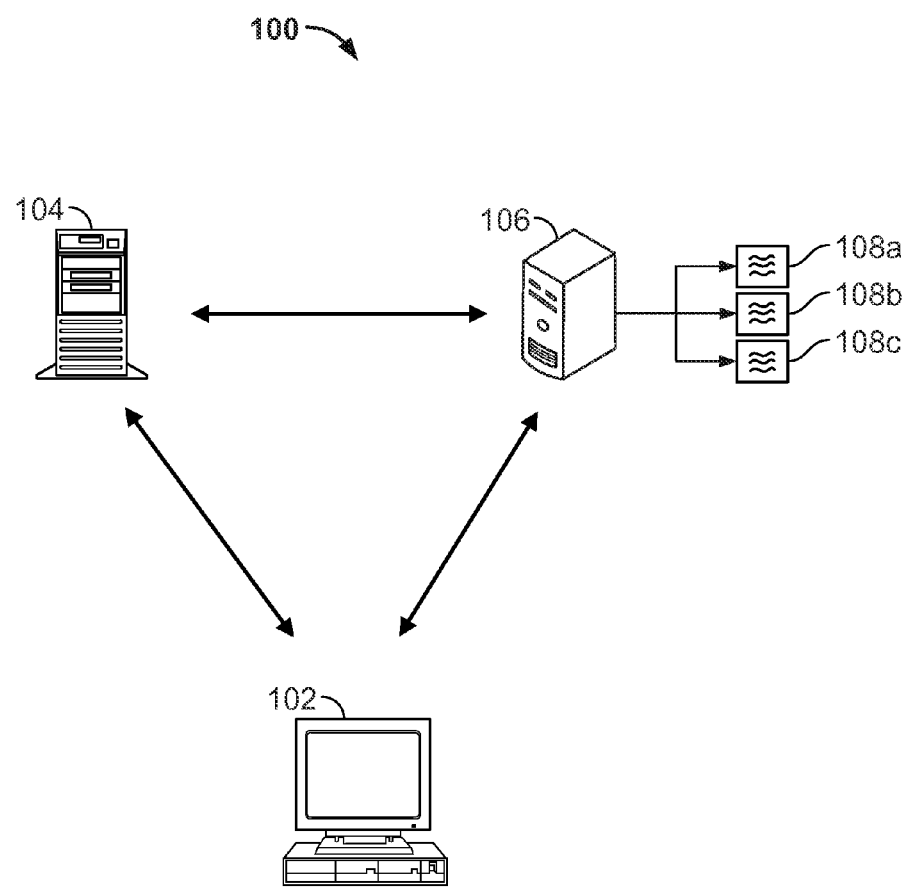
FIG. 1 shows a client computer in communication with a cloud storage service and a social media service in accordance with an implementation as described herein.

A network system in which a user on a client computer may connect to a cloud storage service and a social media service is first described. FIG. 1 shows a system 100 that includes client computer 102, social media service 104, and cloud storage service 106. Client computer 102 may be a desktop computer, laptop computer, tablet, smart phone, mobile electronic device, or any other device that may connect to a remote network. System 100 may include many client computers that connect with social media service 104 and cloud storage service 106. System 100 may include a multitude of client computers, cloud storage services, and social media services connected together. The services and client computers of system 100 are connected through a remote network, such as the Internet.

Social media service 104 is a service that users may connect with from a remote location, such as client computer 102. Social media service 104 may provide users with a multitude of features for communicating with each other and for sharing content. For example, social media service 104 may allow a user to connect with other users and classify them according to different relationships. For example, some contacts may be friends of the user while others may be coworkers. Social media service 104 may allow the user to create a profile of the user and to share written posts, photographs, videos, private messages, web links, and other content with all or a subset of the user's contacts. Social media service 104 may also allow the user to share documents 108a through 108c stored on cloud storage service 106. One or more servers may be used to provide social media service 104 and to connect with other devices in system 100.

Cloud storage service 106 may include one or more servers for providing cloud storage services to a user on client computer 102. For example, cloud storage service 106 may include a number of data servers for storing a number of documents 108a through 108c for users of cloud storage service 106. Cloud storage service 106 may store a large number of such files in total for a number of users. Files that are stored in the cloud storage service may include word processing documents, spreadsheets, presentations, pictures, music, videos, and a variety of other file formats. A user may use client computer 102 to log into cloud storage service 106 using a username and password or other login mechanism and access data files owned by the user. Each document in cloud storage service 106 may be associated with a unique URL. For example, document 108a is associated with a URL different from the URLs for documents 108b and 108c. Each of documents 108a through 108c may also be associated with an ACL, which controls who may access the document and each person's level of access (e.g. read access, write access). Cloud storage service 106 may also generate and cache preview thumbnails for documents 108a through 108c. These thumbnails represent the current state of the document and are usually updated by cloud storage service 106. The updates may occur on a regular basis (e.g. every five minutes) or may occur whenever the document is edited. The thumbnails may be stored independently of the documents, such as in a thumbnail repository, and are associated with URLs. Documents 108a through 108c may be shared on social media service 104, which is discussed in further detail below.

Figure 2:
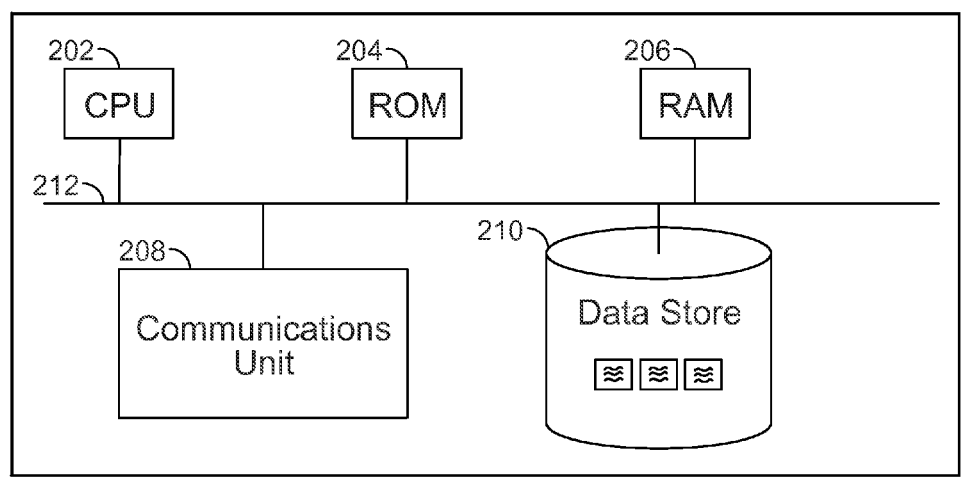
FIG. 2 shows a server implementing a cloud storage service in accordance with an implementation as described herein.

A server for providing a cloud storage service is now described in more detail. Server 200 in FIG. 2 shows an example of a server for use in a cloud storage service. A cloud storage service may include a number of servers that collectively provide the cloud storage service. Server 200 includes a central processing unit (CPU) 202, read only memory (ROM) 204, random access memory (RAM) 206, communications unit 208, data store 210, and bus 212. Server 200 may have additional components that are not illustrated in FIG. 2. Bus 212 allows the various components of server 200 to communicate with each other. Communications unit 208 allows the server 200 to communicate with other devices, such as client computers, other servers in the cloud storage service, or social media services. Data store 210 may store, among other things, data files belonging to users of the cloud storage service, such as documents 108a through 108c in FIG. 1. Users connect with server 200 through communications unit 208, which is connected to a remote network, such as the Internet, to access their files stored in data store 210.

Figure 3:
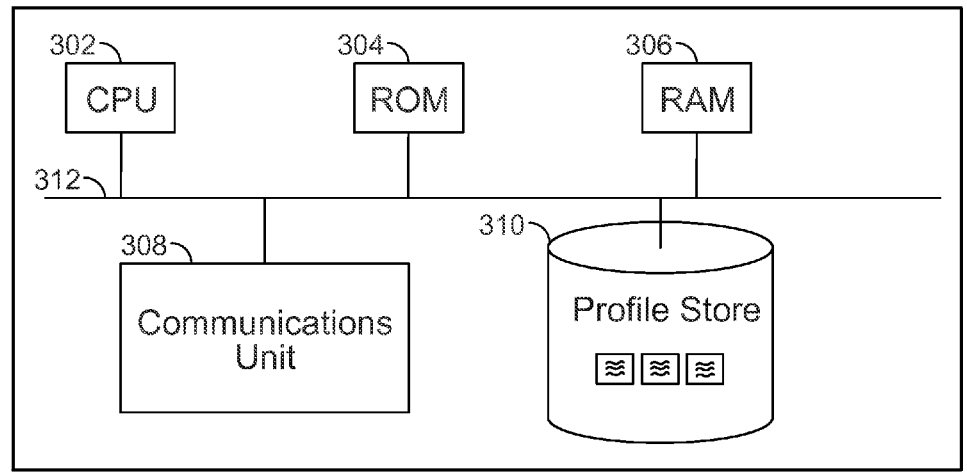
FIG. 3 shows a server implementing a social media service in accordance with an implementation as described herein.

A server for providing a social media service is now described in more detail. Server 300 in FIG. 3 shows an example of a server for use in a social media service. A social media service may include a number of servers that collectively provide the social media service. Server 300 includes a central processing unit (CPU) 302, read only memory (ROM) 304, random access memory (RAM) 306, communications unit 308, profile store 310, and bus 312. Server 300 may have additional components that are not illustrated in FIG. 3. Bus 312 allows the various components of server 300 to communicate with each other. Communications unit 308 allows the server 300 to communicate with other devices, such as client computers, other servers in the social media service, or cloud storage services. Profile store 310 may store, among other things, user profiles and data associated with each user, such as uploaded and shared content, messages, and contact lists. Users connect with server 300 through communications unit 308 to access their profiles stored in profile store 310.

Data store 210 for providing cloud storage services and profile store 310 for providing social media services may be implemented using non-transitory computer-readable media. In addition, other programs executing on server 200 in FIG. 2 and server 300 in FIG. 3 may be stored on non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and readable, once-writable, or rewriteable CD-ROM and DVD-ROM disks.

Figure 4:
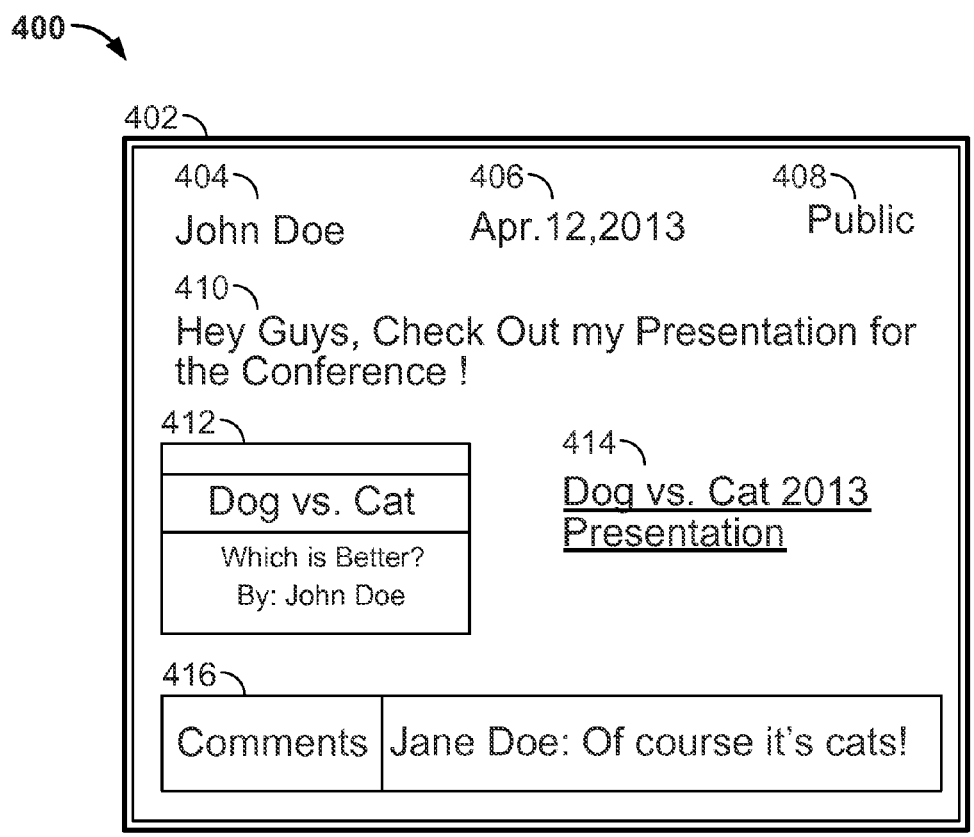
FIG. 4 shows a social media service web page including a share box interface for sharing documents stored on a cloud storage service in accordance with an implementation as described herein.

How documents stored on a cloud storage service may be shared on a social media service is now described. User interface 400 in FIG. 4 shows an example of a shared post that a user may make on a social media service. User interface 400 includes a share box 402 in which a user may share content that all or a subset of the user's contacts may view. For example, share box 402 may feature written text by the user, photographs or videos uploaded by the user, or web links. Share box 402 may also feature a document stored on a cloud storage service. Share box 402 may include the username 404 of the user, in this case "John Doe." Share box 402 may also include time/date information 406 that specifies when the user posted the content of share box 402. Share box 402 may also include privacy setting 408 which allows the user to adjust which of the user's contacts may see the post. For example, setting privacy setting 408 to "Public" may allow everyone, including persons who are not registered users of the social media service, to see the post.

A user may share a document stored on a cloud storage service using share box 402 by entering in the URL of the document. When a user shares the document, several elements may appear in share box 402. A link 414 is shown that includes the URL of the document and any person who sees the post may select link 414 to navigate to the document. The user may add descriptive text 410 along with link 414. Also, thumbnail 412 may be shown. Thumbnail 412 provides a preview image of the document, such as the first slide of a presentation document or the first page of a word processing document. Thumbnail 412 is obtained from the cloud storage service. Share box 402 may also contain comment section 416 for other users to comment on the user's post. A user may also re-share a post that another user has posted with an additional group of contacts. Although a user may share the contents of share box 402 and thumbnail 412 with any group of people on the social media service, if the ACL of the document does not give permission for certain people to access the document those persons cannot access the document by selecting link 414. The layout, options, and features of a share box in a social media service are not limited to what is illustrated in FIG. 4.

Thumbnail 412 in share box 402 is obtained from the cloud storage service. When the URL of the document is entered into share box 402, the social media service recognizes that the document is stored on the cloud storage service. For example, the social media service may identify the domain name in the URL and determine that the domain name belongs to a particular cloud storage service. The social media service queries the cloud storage service for a thumbnail. The cloud storage service usually has a cached thumbnail that is provided to the social media service through a URL. The cloud storage service updates the cached thumbnail so that it always shows an image of the most recent version of the document. The stored thumbnail is usually independent of the document (e.g. it is stored in a separate image repository on the cloud storage service). For example, if a user posts a document in share box 402 the cloud storage system provides a URL of thumbnail 412 to the social media service (e.g. the first page of a presentation). Thumbnail 412 shows a preview image of the current version of the document. If the document is edited at a later date, the cloud storage service caches a new thumbnail showing the updated version of the document. The URL to the thumbnail remains the same, so a person viewing the post after the document has been edited would see the updated thumbnail.

However, a user may not always want other people to see the most recent version of a document. For example, even if the user wanted to keep future edits private, thumbnail 412 in share box 402 would still be updated whenever the document is edited and thus people who can see the post can view the updated document against the user's wishes. In addition, if the document is deleted, the user may expect that no one can view any part of the document. But because the preview thumbnail and URL are stored independently of the document, the thumbnail may still be viewed by people who can see the post even though the underlying document has been deleted.

In order to prevent such results, systems and methods are described herein for storing a preview image of a document shared over a social media service and for showing a preview image for a document shared on a social media service, where the preview image is static and does not automatically update when the document is updated. The cloud storage service creates a thumbnail of the document when notified by the social media service that the document is being shared. The social media service sends the cloud storage service information identifying the user sharing the document and optionally information identifying the persons or groups that the document is being shared with, such as usernames or other forms of unique identification. This thumbnail is stored in the metadata of the document and given a unique URL. The URL may contain identifying information for the user sharing the document, such as a username. The cloud storage service maintains an ACL for the URL that records who shared the document, and may optionally include the contacts with whom the document was shared. The ACL of the URL is separate from the ACL of the document itself. Sharing the document with contacts on the social media service does not automatically add the contacts to the ACL of the document. The thumbnail is not updated or cached and therefore only shows a preview image of the document at the time the user shares the document. If at a later time the user shares the document again, another thumbnail is created that shows a preview of the document at the time the document is shared again. This second thumbnail is also stored in the document metadata and is assigned a different URL than the first thumbnail. The second post sharing the document uses the URL of the second thumbnail while the first post uses the URL of the first thumbnail. Because the thumbnails are stored in the metadata, when the document is deleted, the thumbnail is deleted as well. If a preview thumbnail cannot be created when the social media service notifies the cloud storage service that the document is being shared, for example if the cloud storage service has limited memory for storing thumbnails, then users attempting to view the thumbnail may be given an error message.

Figure 5:
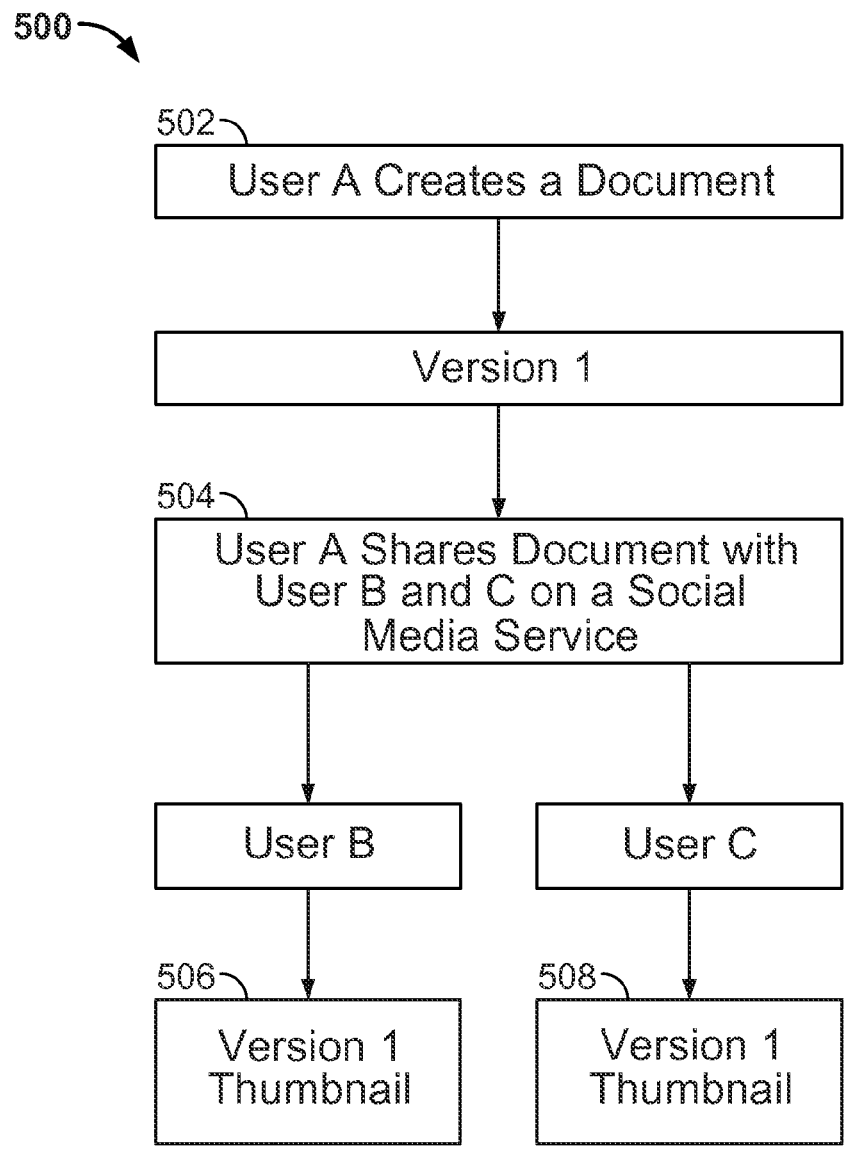
FIG. 5 shows a flow chart of a method for displaying a preview thumbnail of a document stored on a cloud storage service and shared on a social media service in accordance with an implementation as described herein.

The flowcharts of FIGS. 5-8 illustrate the use of static document thumbnails in a social media service. In FIG. 5, User A creates a document on a cloud storage service, illustrated at 502. Alternatively, another user may have created the document and User A has access to the document, or the other user has shared the document with User A on a social media service. A first version of the document is saved on the cloud storage service and is associated with a URL. User A then shares (or re-shares) the document with Users B and C on the social media service, illustrated at 504. For example, User A may enter the URL of the document into a share box provided by the social media service, such as the user interface shown in FIG. 4. The social media service recognizes that the URL links to a document stored on the cloud storage service and sends a request or notification to the cloud storage service that the document is being shared. The notification includes information identifying the user sharing the document (User A) and may optionally include information identifying the users that User A has shared with (Users B and C). The cloud storage service generates a thumbnail image of version 1 of the document and stores it in the metadata of the document. The cloud storage service associates the thumbnail with a URL and generates an ACL for the URL. User A, and optionally Users B and C as well, are added to the ACL and the URL is sent to the social media service. The URL may contain information identifying User A. Alternatively, if User A re-shared the document, the URL and ACL have already been created and User A (and optionally users B and C) are simply added to the ACL. Other information may also be sent to the social media service along with the thumbnail URL, such as the document title, a URL for the document itself, and a URL for a bookmark icon. The social media service loads the thumbnail from the URL and provides the thumbnail to Users B and C when they attempt to view the thumbnail such that they both view a thumbnail of version 1 of the document, illustrated at 506 and 508.

Figure 6:
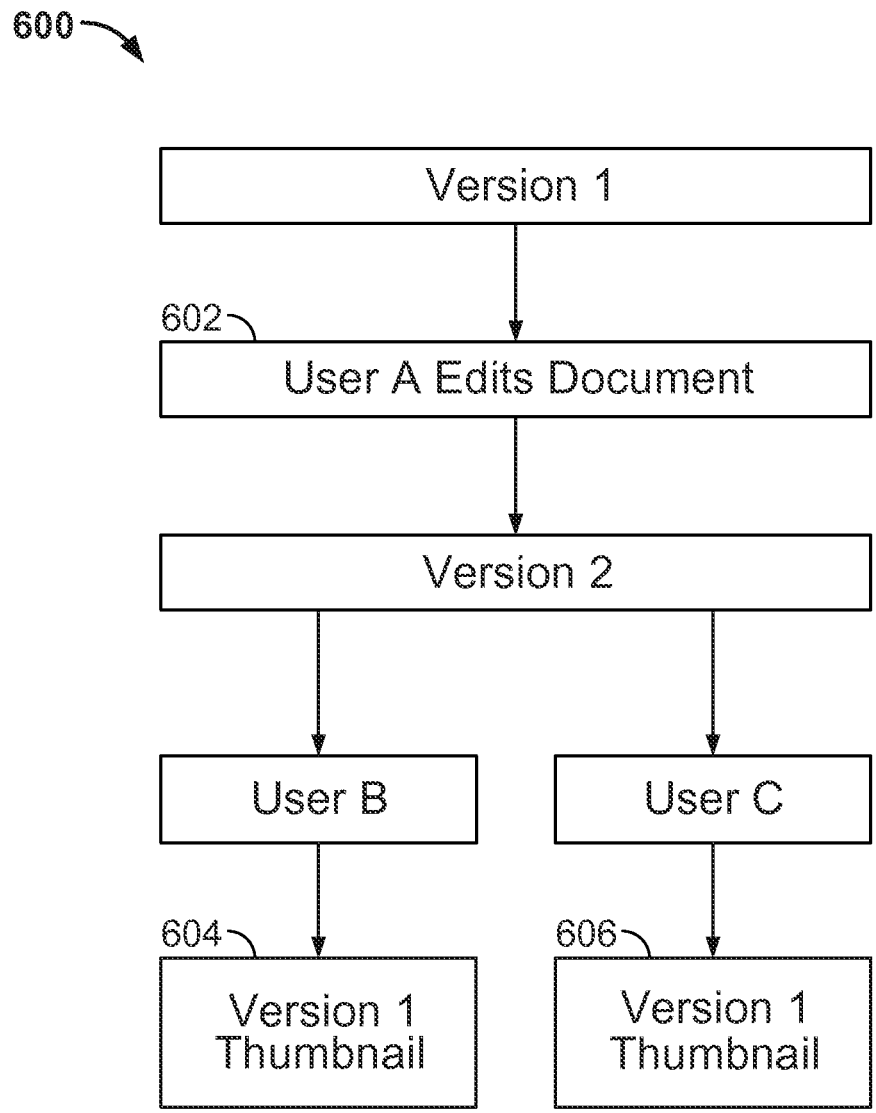
FIG. 6 shows another flow chart of a method for displaying a preview thumbnail of a document stored on a cloud storage service and shared on a social media service in accordance with an implementation as described herein.

The effect of later edits to the document are shown in FIG. 6. After User A shares version 1 of the document with Users B and C, User A edits or otherwise changes version 1 of the document, shown at 604, and saves the new version of the document as version 2. Alternatively, another person with write access to the document may have edited it. However, edits to the document do not change the thumbnail of version 1 stored in the document metadata. Thus when Users B and C attempt to view a preview of the document shared with them by User A, the social media service uses the URL to load the thumbnail of version 1 of the document, shown at 604 and 606. Users B and C do not see a preview of version 2 of the document but rather see a preview of the document at the time the document was shared.

Figure 7:
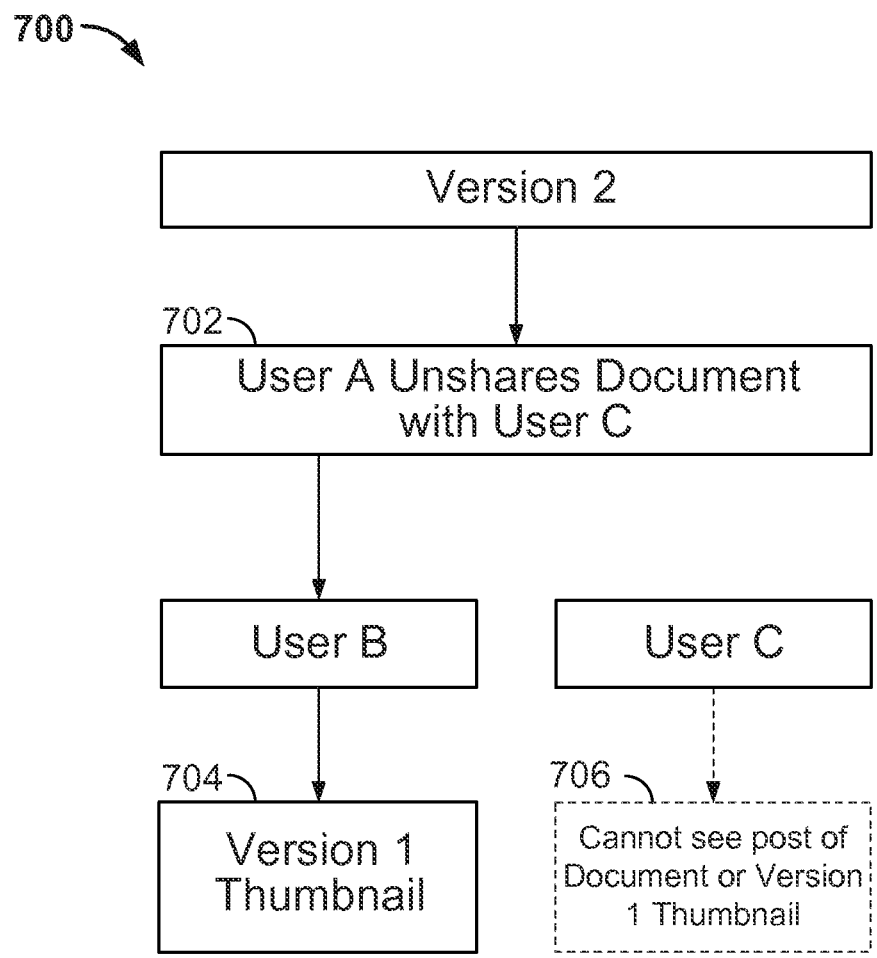
FIG. 7 shows another flow chart of a method for displaying a preview thumbnail of a document stored on a cloud storage service and shared on a social media service in accordance with an implementation as described herein.

The effect of changing who the document is shared with is shown in FIG. 7. The cloud storage service stores version 2 of the document after User A has edited it, while version 1 of the document has been shared on the social media service. User A decides that he or she no longer wants to share the document on the social media service with User C, shown at 702. User A may command the social media service to "un-share" the document with User C. For example, the social media service may allow users to modify the visibility of a post to either increase or decrease the number of people who can view it. When this occurs, the social media service notifies the cloud storage service that User A has revoked User C's permission to view the post of the document. If User C has been added to the ACL of the URL, the cloud storage service removes User C from the ACL of the URL. The cloud storage service may use other means to block User C from accessing the URL. Thus User C no longer sees the post about the document or the thumbnail preview of the document, shown at 706. However, User B may still view a thumbnail of version 1 of the document, shown at 704. If User A re-shared the document from another person and that person un-shares the document with User A, Users B and C may also no longer view the post because their permission was based on User A's permission to view the post.

Figure 8:
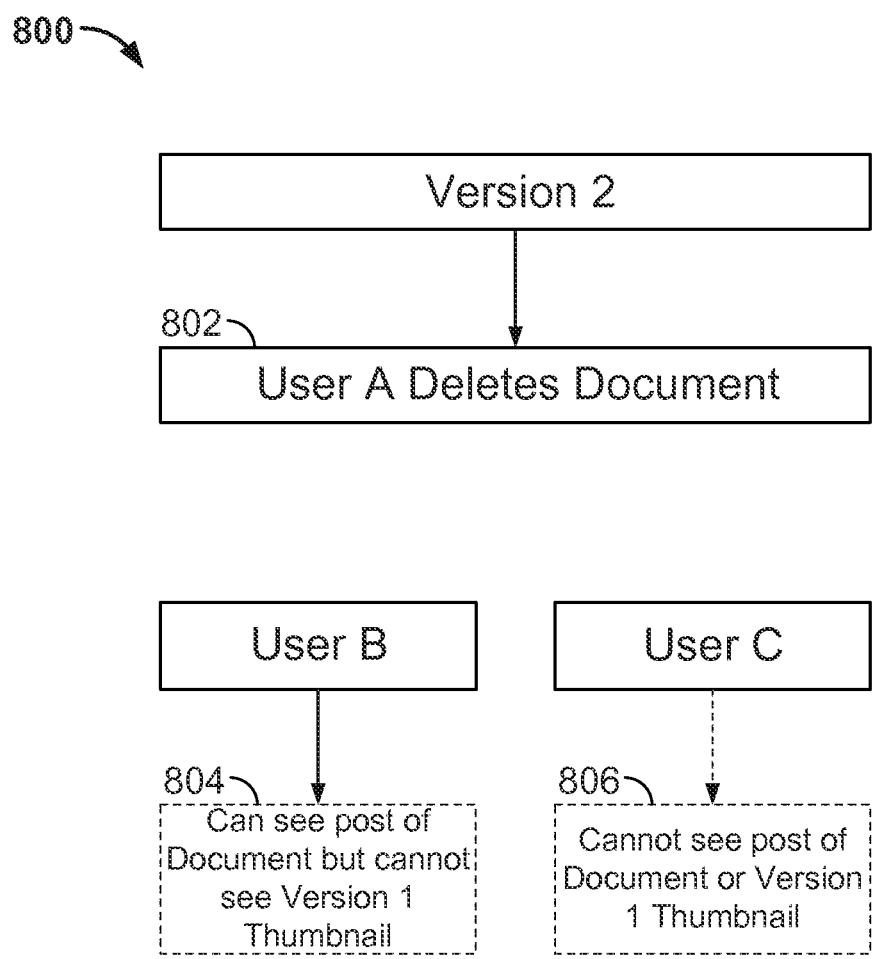
FIG. 8 shows another flow chart of a method for displaying a preview thumbnail of a document stored on a cloud storage service and shared on a social media service in accordance with an implementation as described herein.

The effect of deleting the shared document is shown in FIG. 8. Version 2 of the document is stored on the cloud storage service while version 1 of the document has been shared on the social media service. User A has unshared the document with User C. At a later time, User A decides to delete the document from the cloud storage service, shown at 802. Alternatively, another person with write access to the document may decide to delete it. Because the preview thumbnail of the document is stored in the document metadata, the thumbnail is also deleted along with the document.

However, the post sharing the document on the social media service is not deleted. Thus User B may still see the post regarding the document but cannot view the thumbnail preview, shown at 804. An error message may replace the thumbnail, for example notifying User B that a preview is no longer available or that the document has been deleted. Meanwhile, User C still cannot see the post at all because User A has unshared the document with User C. Thus FIGS. 5-8 show how a static preview thumbnail generated by a cloud storage service is displayed on a social media service.

Figure 9:
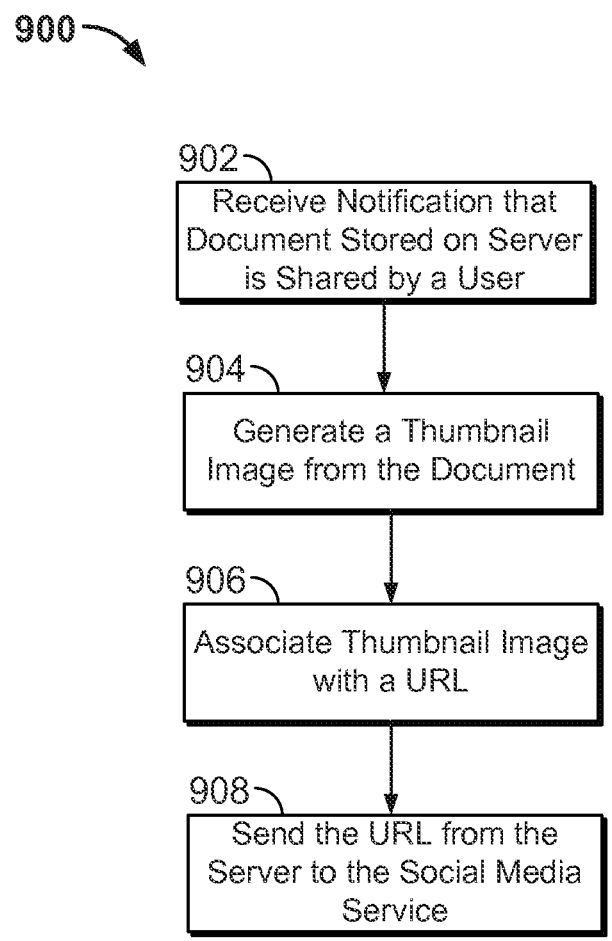
FIG. 9 shows a method for storing a preview image of a document shared over a social media service in accordance with an implementation as described herein.

A method of storing a preview image of a document shared over a social media service is herein described. FIG. 9 illustrates a method 900 which includes receiving at a server a first notification that a document stored on the server is being shared on a post by a first user on the social media service, where the first notification includes information identifying the first user. The method further includes generating a thumbnail image from the document, where the thumbnail image is stored in the document metadata and is a representative image of a first version of the document at the time the user shares the document. The method further includes associating the thumbnail image with a URL, where the URL has an access control list that includes the first user, and sending the URL from the server to the social media service. Method 900 may be performed on one or more servers providing a cloud storage service, such as the server illustrated in FIG. 2. The cloud storage service communicates with at least one social media service and at least one client computer, such as the system illustrated in FIG. 1.

Method 900 begins when a user on a social media service attempts to share through a post a document stored on a server providing a cloud storage service. For example, the user may input the URL of the document into a share box provided by the social media service, such as the one illustrated in FIG. 4. The social media service may determine from the domain name and other information contained in the URL that the URL links to a document stored on the server. The social media service sends a request or notification to the server that the document is being shared, illustrated at 902. The notification includes information identifying the user sharing the document, such as a username. The notification include may include information identifying a number of contacts, which may be individuals or groups, that the user is sharing the document with. For example, the user may share the document with select contacts, a group of contacts such as family or coworkers, or may share the document with the public.

When the server receives the notification from the social media service, the server identifies the document being shared and generates a thumbnail image of the document, illustrated at 904. The thumbnail image is a representative image of the document at the time the user shares the document. For example, if the document is at version number 3 when it is shared, the thumbnail image will be representative of version 3 of the document. The thumbnail image may be, for example, the first page of a word processing document or the first slide of a presentation document. Thumbnail images may be generated by any known method, such as using a script to convert a portion of the document into an image format such as a JPEG, BMP, GIF, or PNG. The thumbnail image is stored in the metadata of the document. The server may also periodically cache thumbnail images of the document. When the notification from the social media service is received, the server takes the most recent cached thumbnail and saves it into the document metadata.

After the server generates the thumbnail image, the server associates the thumbnail image with a URL, illustrated at 906. The URL is unique to the thumbnail image and has an associated ACL. The user is added to the ACL, and optionally the contacts that the user has shared the document with are also added to the ACL. The ACL of the URL restricts the individuals who can view the thumbnail to the user and those contacts the user has shared the document with. The text of the URL may also contain information identifying the user who shared the document.

After the URL of the thumbnail image is created it is sent to the social media service, illustrated at 908. Other information may also be sent to the social media service along with the thumbnail URL, such as the document title, a URL for the document itself, and a URL for a bookmark icon. When a contact attempts to view the thumbnail image, the social media service verifies with the server that the contact may access the thumbnail URL. The social media service then displays the thumbnail to the contact. Although the contact may be able to see the thumbnail, the contact may not be able to access the document itself if the contact is not also on the ACL of the document. The URL and document maintain separate ACLs. Sharing the document with contacts on the social media service does not automatically add the contacts to the ACL of the document. The thumbnail image associated with the URL does not change. Even if the document undergoes additional revisions, the thumbnail will continue to be a representative image of the document at the time the user shared it. If the user un-shares, or revokes permission, for one or more contacts to view the post of the document, those contacts are removed from the ACL of the URL. If the document is shared again at a later time, an additional thumbnail image with its own URL is created and stored in the document metadata, one that represents the document at the time it is shared again. If the user re-shares a document that has been shared with the user, then the user will be added to the ACL of the URL along with the original poster. The user and the contacts the user re-shared the post with will continue to have access to the thumbnail image until the person who shared the document with the user revokes the user's permission to view the post, in which case the server will remove the user from the ACL of the URL. If the document is deleted, the thumbnail image is also deleted. The server may direct the URL to an error message instead. In this way, method 900 provides a way of storing a preview image of a document shared over a social media service.

Figure 10:
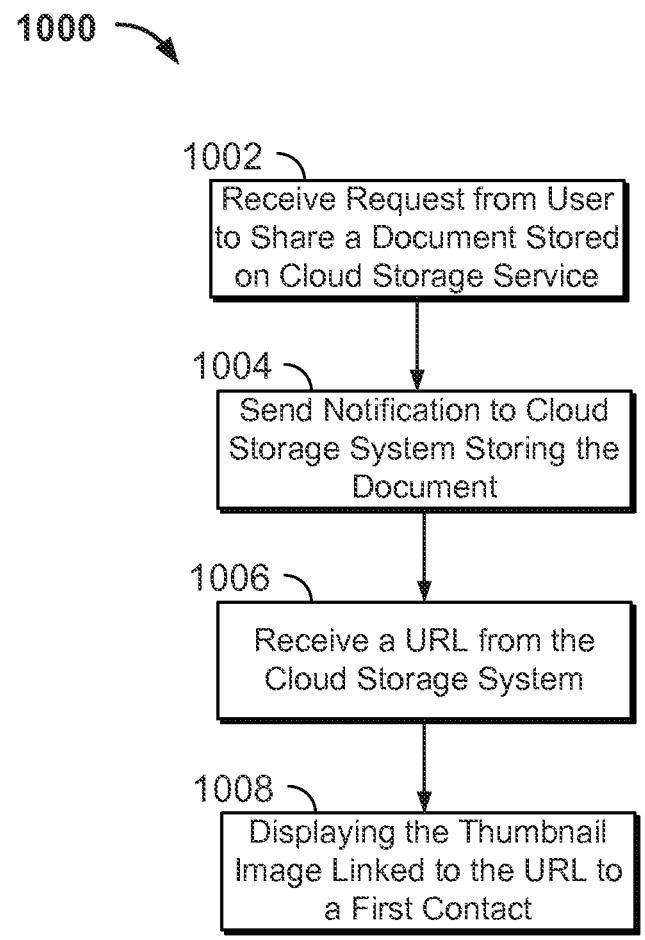
FIG. 10 shows a method for showing a preview image for a document stored on a cloud storage service in accordance with an implementation as described herein.

A method of showing a preview image for a document stored on a cloud storage service is herein described. FIG. 10 illustrates a method 1000 which includes receiving, at a server hosting a social media service, a request from a first user to share a post of a document stored on the cloud storage system with a plurality of contacts. The method further includes sending a first notification to the cloud storage service that the first user is sharing the document, where the first notification includes information identifying the first user. The method further includes receiving a URL from the cloud storage system, where the URL links to a thumbnail image representative of a first version of the document at the time the first user shares the document, and displaying the thumbnail image to a first contact in the plurality of contacts when the first contact requests the thumbnail image. Method 1000 may be performed on one or more servers providing a social media service, such as the server illustrated in FIG. 3. The social media service communicates with at least one cloud storage service and at least one client computer, such as the system illustrated in FIG. 1.

Method 1000 begins when a server providing a social media service receives a request from a user to share via a posting a document stored on a cloud storage service, illustrated at 1002. For example, the user may input the URL of the document into a share box provided by the server, such as the one illustrated in FIG. 4. The user specifies a number of contacts, which may be individuals or groups, that the user is sharing the document with. For example, the user may share the document with select contacts, a group of contacts such as family or coworkers, or may share the document with the public.

After the server receives the request to share the document, the server sends a request or notification to the cloud storage service, illustrated at 1004. The social media service may determine from the domain name and other information contained in the URL of the document that the URL links to a document stored on a particular cloud storage service. The notification includes information identifying the user sharing the document, such as a username, and may also include information identifying contacts that the user is sharing the document with.

The cloud storage service receives the notification and sends back a URL linked to a thumbnail image that is a representative image of the document at the time the user shares it, illustrated at 1006. For example, if the document is at version number 3 when it is shared, the thumbnail image will be representative of version 3 of the document. The thumbnail image may be, for example, the first page of a word processing document or the first slide of a presentation document. The cloud storage service may generate thumbnail images by any known method, such as using a script to convert a portion of the document into an image format such as a JPEG, BMP, GIF, or PNG. The thumbnail image is stored in the metadata of the document. The cloud storage service associates the thumbnail image with a unique URL. The URL has an associated ACL. The user, and optionally the contacts that the user has shared the document with, are added to the ACL. The ACL of the URL restricts the individuals who can view the thumbnail to the user and those contacts the user has shared the document with. The text of the URL may also contain information identifying the user who shared the document. This URL is sent back to the server. Other information may also be sent to the sever along with the thumbnail URL, such as the document title, a URL for the document itself, and a URL for a bookmark icon.

After the server receives the URL from the cloud storage service, the server uses the URL to display the thumbnail image to any contact that requests the image, illustrated at 1008. When a contact attempts to view the thumbnail image, the server verifies with the cloud storage service that the contact may access the URL. The server then displays the thumbnail to the contact. Although the contact may be able to see the thumbnail, the contact may not be able to access the document itself if the contact is not also on the ACL of the document. The URL and document maintain separate ACLs. Sharing the document with contacts on the social media service does not automatically add the contacts to the ACL of the document. The thumbnail image associated with the URL does not change. Even if the document undergoes additional revisions, the thumbnail will continue to be a representative image of the document at the time the user shared it. If the user un-shares, or revokes permission, for one or more contacts to view the post of the document, those contacts are removed from the ACL of the URL. If the document is shared again at a later time, an additional thumbnail image with its own URL is created and stored in the document metadata, one that represents the document at the time it is shared again. If the user re-shares a document that has been shared with the user, then the user will be added to the ACL of the URL along with the original poster. The user and the contacts the user re-shared the post with will continue to have access to the thumbnail image until the person who shared the document with the user revokes the user's permission to view the post, in which case the server will remove the user from the ACL of the URL. If the document is deleted, the thumbnail image is also deleted. The cloud storage service may direct the URL to an error message instead. In this way, method 1000 provides a way of showing a preview image for a document stored on a cloud storage service.

It will be apparent that aspects of the systems and methods described herein may be implemented in many different forms of software, firmware, and hardware in the implementations illustrated in the figures. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for storing a preview image of a document shared over a social media service, the method comprising:
   receiving at a cloud storage server a first notification that a document stored on the cloud storage server is being shared on a post by a first user on the social media service, wherein the first notification includes information identifying the first user;
   generating a first thumbnail image from the document, wherein the first thumbnail image is stored in the document metadata and is a representative image of a first version of the document at a first time the user shares the document;
   associating the first thumbnail image with a first URL, wherein the first URL has an access control list that includes the first user;
   sending the first URL from the cloud storage server to the social media service;
   receiving at a cloud storage server a second notification that the document is being shared by the first user on the social media service at a second time later than the first time,
   wherein the first URL linking to the first thumbnail image is shared on the social media service before the second time;
   generating a second thumbnail image and a second URL linking to the second thumbnail at the second time, wherein the second thumbnail image represents a second version of the document at the second time; and
   sending, to the social media service, the second URL linking to the second thumbnail image.

2. The method of claim 1, wherein the information identifying the first user is embedded in the URL.

3. The method of claim 1, the method further comprising updating the document to produce a second version of the document, wherein the thumbnail image remains a representative image of the first version of the document.

4. The method of claim 1, the method further comprising deleting the document from the server, wherein the thumbnail image is also deleted.

5. The method of claim 4, wherein the URL is associated with an error message.

6. The method of claim 1, wherein the social media service also sends to the server a plurality of contacts with whom the first user has shared the post.

7. The method of claim 6, wherein the server adds the plurality of contacts to the access control list of the URL.

8. The method of claim 7, the method further comprising:
receiving at the server a second notification that the first user has revoked permission for a first contact in the plurality of contacts to view the post; and
removing the first contact from the access control list of the URL.

9. The method of claim 7, wherein the document is associated with an access control list separate from the access control list of the URL.

10. The method of claim 9, wherein a first contact in the plurality of contacts is on the access control list of the URL but not on the access control list of the document such that the first contact is permitted to view the thumbnail image but is not permitted to access the document.

11. The method of claim 1, the method further comprising:
receiving at the server a second notification that a second user has revoked permission for the first user to share the document; and
removing the first user from the access control list of the URL.

12. A system for storing a preview image of a document shared over a social media service, the system comprising:
a cloud storage server comprising a processor and a memory unit, wherein the server is configured to:
communicate with a plurality of client computers and a social media service using a communication connection;
receive a first notification that a document stored on the cloud storage server is being shared on a post by a first user on the social media service, wherein the first notification includes information identifying the first user;
generate a first thumbnail image from the document, wherein the first thumbnail image is stored in the document metadata and is a representative image of a first version of the document at a first time the user shares the document;
associate the thumbnail image with a URL, wherein the URL has an access control list that includes the first user; and
send the first URL from the cloud server to the social media service;
receive at a cloud storage server a second notification that the document is being shared by the first user on the social media service at a second time later than the first time,
wherein the first URL linking to the first thumbnail image is shared on the social media service before the second time;
generate a second thumbnail image and a second URL linking to the second thumbnail at the second time, wherein the second thumbnail image represents a second version of the document at the second time; and
send, to the social media service, the second URL linking to the second thumbnail image.

13. The system of claim 12, wherein the information identifying the first user is embedded in the URL.

14. The system of claim 12, wherein the server is further configured to update the document to produce a second version of the document, wherein the thumbnail image remains a representative image of the first version of the document.

15. The system of claim 12, wherein the server is further configured to delete the document from the server, wherein the thumbnail image is also deleted.

16. The system of claim 15, wherein the server associates the URL with an error message.

17. The system of claim 12, wherein the server is further configured to receive from the social media service a plurality of contacts with whom the first user has shared the post.

18. The method of claim 17, wherein the server is further configured to add the plurality of contacts to the access control list of the URL.

19. The system of claim 17, wherein the server is further configured to:
receive a second notification that the first user has revoked permission for a first contact in the plurality of contacts to view the post; and
remove the first contact from the access control list of the URL.

20. The system of claim 17, wherein the document is associated with an access control list separate from the access control list of the URL.

21. The system of claim 20, wherein a first contact in the plurality of contacts is on the access control list of the URL but not on the access control list of the document such that the first contact is permitted to view the thumbnail image but is not permitted to access the document.

22. The system of claim 17, wherein the server is further configured to:
receive a second notification that a second user has revoked permission for the first user to share the document; and
removing the first user from the access control list of the URL.

23. A method for showing a preview image for a document stored on a cloud storage service system, the method comprising:
receiving, at a server hosting a social media service, a request from a first user to share a post of a document stored on the cloud storage system with a plurality of contacts;
sending, from the server hosting the social media service, a first notification to the cloud storage service system that the first user is sharing the document, wherein the first notification includes information identifying the first user;
receiving a first URL from the cloud storage service system, wherein the first URL links to a first thumbnail image representative of a first version of the document at a first time the first user shares the document;
displaying the first thumbnail image to a first contact in the plurality of contacts when the first contact requests sharing of the document, wherein the first URL linking to the first thumbnail image is shared on the social media service before a second time when a second notification is received at the cloud storage service system that the document is being shared by the first user;
receiving a second thumbnail image and a second URL linking to the second thumbnail at a second time, wherein the second thumbnail image represents a second version of the document at the second time; and
displaying the second thumbnail image and the second URL to the first contact in the plurality of contacts after the second time.

24. The method of claim 23, wherein when the document is updated to produce a second version of the document, the thumbnail image remains a representative image of the first version of the document.

25. The method of claim 23, wherein when the document is deleted on the cloud storage service, the thumbnail image is no longer displayed.

26. The method of claim 25, wherein the server displays an error message when the first contact requests the thumbnail image.

27. The method of claim 23, the method further comprising:
   receiving at the server a request by the first user to revoke permission for the first contact to view the post; and
   sending a second notification to the cloud storage service that the first contact's permission to view the post has been revoked.

28. The method of claim 23, the method further comprising:
   receiving at the server a request by a second user to revoke permission for the first user to view the post; and
   sending a second notification to the cloud storage service that the first user's permission to view the post has been revoked.

29. The method of claim 23, wherein the URL is associated with an access control list that includes the user.

30. A system for showing a preview image for a document stored on a cloud storage service, the system comprising:
   a server comprising a processor and a memory unit, wherein the server is configured to:
   communicate with a plurality of client computers and the cloud storage service system using a communication connection;
   receive a request from a first user to share a post of a document stored on the cloud storage service system with a plurality of contacts;
   send a first notification to the cloud storage service system that the first user is sharing the document, wherein the first notification includes information identifying the first user;
   receive a first URL from the cloud storage service system, wherein the first URL links to a first thumbnail image representative of a first version of the document at a first time the first user shares the document;
   display the first thumbnail image to a first contact in the plurality of contacts when the first contact requests sharing of the document, wherein the first URL linking to the first thumbnail image is shared on the social media service before a second time when a second notification is received at the cloud storage service system that the document is being shared by the first user;
   receive a second thumbnail image and a second URL linking to the second thumbnail at a second time, wherein the second thumbnail image represents a second version of the document at the second time; and
   display the second thumbnail image and the second URL to the first contact in the plurality of contacts after the second time.

31. The system of claim 30, wherein when the document is updated to produce a second version of the document, the thumbnail image remains a representative image of the first version of the document.

32. The system of claim 30, wherein when the document is deleted on the cloud storage service, the thumbnail image is no longer displayed.

33. The system of claim 30, the server further configured to:
   receive a request by the first user to revoke permission for the first contact to view the post; and
   send a second notification to the cloud storage service that the first contact's permission to view the post has been revoked.

34. The system of claim 30, the server further configured to:
   receive a request by a second user to revoke permission for the first user to view the post; and
   send a second notification to the cloud storage service that the first user's permission to view the post has been revoked.

35. The system of claim 30, wherein the URL is associated with an access control list that includes the user.

* * * * *